(12) United States Patent
Demosthenous et al.

(10) Patent No.: US 9,073,797 B2
(45) Date of Patent: Jul. 7, 2015

(54) MAGNESIUM SULPHATE

(75) Inventors: Maria Demosthenous, Calais (FR); Stephane Devos, Calais (FR); Karine Hamez, Autingues (FR); Celine Regis Dit Duchaussoy, Calais (FR); Claude Pollet, Boulogne-sur-Mer (FR); Sylvain Caulier, Hellemmes (FR)

(73) Assignee: TIOXIDE EUROPE SAS, Calais (FR)

( * ) Notice: Subject to any disclaimer, the term of this patent is extended or adjusted under 35 U.S.C. 154(b) by 0 days.

(21) Appl. No.: 14/343,234

(22) PCT Filed: Aug. 31, 2012

(86) PCT No.: PCT/EP2012/066973
§ 371 (c)(1),
(2), (4) Date: Mar. 6, 2014

(87) PCT Pub. No.: WO2013/037649
PCT Pub. Date: Mar. 21, 2013

(65) Prior Publication Data
US 2014/0245804 A1  Sep. 4, 2014

(30) Foreign Application Priority Data
Sep. 13, 2011 (GB) .................... 1115836.7

(51) Int. Cl.
*C01F 5/40* (2006.01)
*C01D 5/00* (2006.01)
*C05D 5/00* (2006.01)

(52) U.S. Cl.
CPC .... *C05D 5/00* (2013.01); *C01F 5/40* (2013.01)

(58) Field of Classification Search
CPC .................................... C01F 5/40; C01D 5/00
USPC ....................... 423/166, 554; 71/63
See application file for complete search history.

(56) References Cited

U.S. PATENT DOCUMENTS

| | | | | |
|---|---|---|---|---|
| RE15,973 E | * | 12/1924 | Bachman | 423/554 |
| 3,169,046 A | * | 2/1965 | Nespital | 423/83 |
| 3,936,292 A | * | 2/1976 | Piccolo et al. | 71/63 |
| 5,766,301 A | * | 6/1998 | Marijuan de Santiago et al. | 71/11 |

FOREIGN PATENT DOCUMENTS

| | | | | |
|---|---|---|---|---|
| CA | 1077176 | | 5/1980 | |
| CN | 1220970 | | 6/1999 | |
| CN | 101555055 | | 10/2009 | |
| JP | 3-164487 A | * | 7/1991 | 71/63 |

* cited by examiner

*Primary Examiner* — Timothy Vanoy

(57) ABSTRACT

The invention provides a method of manufacturing a magnesium sulphate product, and a crystalline product comprising magnesium sulphate in the form of crystal or granules. The method comprises the steps of: providing a sulphuric acid product that has been obtained as a by-product during the sulphate process for manufacturing titanium dioxide; concentrating the sulphuric acid product to obtain a concentrated product that has a higher sulphuric acid concentration; combining a magnesium-based neutralising agent with the concentrated product and allowing the magnesium-based neutralising agent and the sulphuric acid to react, to generate magnesium sulphate in solution; and crystallising magnesium sulphate out of the solution, to obtain a crystalline magnesium sulphate product together with a remaining liquor. The crystalline magnesium sulfate may be mixed with an agriculturally acceptable carrier of diluent and/or with other fertiliser materials to produce a fertilizer.

21 Claims, No Drawings

MAGNESIUM SULPHATE

CROSS-REFERENCE TO RELATED APPLICATIONS

This application is the National Phase of International Application PCT/EP2012/066973 filed Aug. 31, 2012 which designated the U.S. and which claims priority to Great Britain App. Serial No. 1115836.7 filed Sep. 13, 2011. The noted applications are incorporated herein by reference.

The present invention relates to a method for the manufacture of a magnesium sulphate product that is suitable for use as a fertiliser.

Magnesium sulphate is widely distributed in nature, e.g. it may be found as a geological salt deposit in the form of kieserite ($MgSO_4.H_2O$) or as the heptahydrate salt epsomite ($MgSO_4.7H_2O$), which is also known as Epsom salt. It may also be found in the form of a double salt langbeinite ($K_2SO_4.2MgSO_4$) and in brines.

Magnesium sulphate may also be produced by reacting magnesium carbonate or magnesium hydroxide with sulphuric acid.

In the sulphate process for the production of titanium dioxide, titanium based raw material, such as ilmenite and/or slag, is directly reacted with sulphuric acid to produce titanium sulphate and ferrous sulphate plus spent sulphuric acid as a co-product. The titanium sulphate is subjected to selective thermal hydrolysis to produce hydrated titanium dioxide. This is further washed and calcined to produce titanium dioxide pigment.

The present invention provides a method of manufacturing a magnesium sulphate product which involves the use of the spent sulphuric acid co-product that arises during the sulphate process for manufacturing titanium dioxide. The thus obtained magnesium sulphate product can be used as a fertiliser.

The method is therefore beneficial in that it enables a useful product to be obtained from spent sulphuric acid. In particular, the end magnesium sulphate product contains other beneficial micronutrients, such as iron sulphate, which make it particularly useful as a fertiliser.

In addition, the spent sulphuric acid from the sulphate process for manufacturing titanium dioxide is currently usually concentrated to about 60%-64% w/w (such as 65% w/w), e.g. in lined vessels with the aid of a high temperature steam associated with vacuum in the vessels. The 60%-64% w/w sulphuric acid would either then be used as such or would be evaporated, (e.g. in a distillation step or in a another series of lined vessels under vacuum and high temperature steam) to obtain about 89%-92% w/w (such as 96% w/w) sulphuric acid, which can then be re-used for the digestion of ilmenite or titanium slag. Salts, known as second filtration salts, are obtained during this concentration of the spent sulphuric acid. These are generally sulphates of Al, Ca, Cr, Fe, Mg, Mn, Na, Ti and/or V, and must be suitably disposed of.

In either case, there is high cost and high energy use associated with this subsequent utilisation of the spent product. The present method avoids the need for such an extensive concentration step in relation to the waste sulphuric acid stream and instead permits its use in a less costly and less energy intensive process.

The present invention provides, in a first aspect, a method for the manufacture of a magnesium sulphate product, the method comprising the steps of:
(a) providing a sulphuric acid product that has been obtained as a by-product during the sulphate process for manufacturing titanium dioxide;
(b) concentrating the sulphuric acid product to obtain a concentrated product that has a higher sulphuric acid concentration;
(c) combining a magnesium-based neutralising agent with the concentrated product and allowing the magnesium-based neutralising agent and the sulphuric acid to react, to generate magnesium sulphate in solution; and
(d) crystallising magnesium sulphate out of the solution, to obtain a crystalline magnesium sulphate product together with a remaining liquor.

In a preferred embodiment, the method further comprises the step of:
(e) separating the crystallised magnesium sulphate product from the remaining liquor.

In one embodiment, the method further comprises the step of:
(f) drying the crystallised magnesium sulphate product.

In one embodiment, after step (e), the method comprises the step of:
(g) recycling the remaining liquor to step (b) and/or step (c) and/or step (d).

This optional step (g) may be carried out regardless of whether optional step (f) is carried out. If optional step (f) is carried out, this may be before step (g), at the same time as step (g), or after step (g).

A benefit of the method is that the generation of solid waste can be reduced or avoided. This contrasts with prior art processes that generate a high amount of waste that would then need to be disposed of.

As the reader will appreciate, in the sulphate process for the production of titanium dioxide, titanium based raw material, such as ilmenite and/or titanium slag, is directly reacted with sulphuric acid to produce titanium sulphate and by-products of ferrous sulphate (usually in the form of ferrous sulfate heptahydrate) plus dilute sulphuric acid. This by-product may be referred to as waste acid or spent sulphuric acid.

The sulphuric acid product provided in step (a) of the present method may be used directly after it has been obtained as a by-product in the sulphate process for the production of titanium dioxide, e.g. it may be used within an hour or less of its generation. Alternatively, sulphuric acid product that has been obtained as a by-product in the sulphate process for the production of titanium dioxide may be stored in a container after its generation, for example for a time period of one hour to several days under gentle agitation, such as 12 hours or more or 24 hours or more.

It may be that the spent sulphuric acid is collected in a storage tank and stored in this tank before use. The concentration step (b) may be carried out in this storage tank, or the spent sulphuric acid may be transferred to another container within which the concentration step (b) can be carried out.

The reader will appreciate that a range of sulphuric acid concentrations might be found in spent sulphuric acid obtained during the sulphate process for manufacturing titanium dioxide. For example, the concentration might be about 24% w/w or less (especially about 23% w/w or less), such as in the range from about 17% to 24% w/w, e.g. from about 17% to 23% w/w or from about 18% to 23% w/w or from about 19% to 22% w/w or from about 20% to 22% w/w. The spent sulphuric acid product that has been obtained as a by-product during the sulphate process for manufacturing titanium dioxide and that is provided in step (a) may have any of these concentrations. The spent sulphuric acid product that is provided in step (a) will most preferably have a sulphuric acid concentration in the range of from about 21 to 22% w/w. However, other concentrations would not render the spent sulphuric acid unsuitable for use in the invention.

The sulphuric acid product provided in step (a) may optionally include ferrous sulphate. Typically, spent sulphuric acid by-product from the sulphate process for the production of titanium dioxide will comprise sulphuric acid, water and ferrous ions ($Fe^{2+}$), usually in the form of ferrous sulphate.

The sulphuric acid product provided in step (a) may in one embodiment include ferrous sulphate in an amount of from 0.1 to 8% w/w, preferably from 0.5 to 6% w/w, such as from 1 to 5%, e.g. from 2 to 5% or from 2 to 4% w/w.

In one embodiment, the sulphuric acid product provided in step (a) may further comprise other trace components, e.g. each in amounts of 5% w/w or less (preferably 4% w/w or less). These may be metal salts; these may optionally be one or more metal salts selected from Al salts, Ca salts, Cr salts, Mg salts, Mn salts, Na salts, Ti salts and V salts. In one preferred embodiment there are metal sulphates present as trace components; these may, for example, be selected from $Al_2(SO_4)_3$, $CaSO_4$, $Cr_2(SO_4)_3$, $MgSO_4$, $MnSO_4$, $Na_2SO_4$, $TiOSO_4$, and $VOSO_4$.

It may be that $Al_2(SO_4)_3$ is present in an amount of 4% w/w or less, such as from 0.1 to 3.5%, e.g. from 0.5 to 2.5% w/w.

It may be that $CaSO_4$ is present in an amount of 2% w/w or less, such as from 0.01 to 1%, e.g. from 0.03 to 0.5% w/w.

It may be that $Cr_2(SO_4)_3$ is present in an amount of 2% w/w or less, such as from 0.01 to 1%, e.g. from 0.03 to 0.5% w/w.

It may be that $MgSO_4$ is present in an amount of 5% w/w or less, such as from 0.5 to 4%, e.g. from 1.5 to 3.5% w/w.

It may be that $MnSO_4$ is present in an amount of 3% w/w or less, such as from 0.01 to 1%, e.g. from 0.05 to 0.5% w/w.

It may be that $Na_2SO_4$ is present in an amount of 3% w/w or less, such as from 0.01 to 1.5%, e.g. from 0.1 to 1% w/w.

It may be that $TiOSO_4$ is present in an amount of 3% w/w or less, such as from 0.05 to 2.5%, e.g. from 0.1 to 2% w/w.

It may be that $VOSO_4$ is present in an amount of 3% w/w or less, such as from 0.01 to 1%, e.g. from 0.05 to 0.5% w/w.

For example, the sulphuric acid product provided in step (a) may comprise

| Component | Preferred Range wt % | Example wt % |
|---|---|---|
| $Al_2(SO_4)_3$ | 0.5 to 2.5 | 1.141 |
| $CaSO_4$ | 0.03 to 0.5 | 0.065 |
| $Cr_2(SO_4)_3$ | 0.03 to 0.5 | 0.087 |
| $FeSO_4$ | 2 to 5 | 3.699 |
| $MgSO_4$ | 1.5 to 3.5 | 2.802 |
| $MnSO_4$ | 0.05 to 0.5 | 0.124 |
| $Na_2SO_4$ | 0.1 to 1 | 0.525 |
| $TiOSO_4$ | 0.1 to 2 | 0.654 |
| $VOSO_4$ | 0.05 to 0.5 | 0.166 |

The method of the invention utilises a concentration stage in step (b). This generally will take the spent sulphuric acid to a concentration in the range of about 26% or more, preferably about 27% or more, such as from about 27% to 40% w/w, or from about 27% to 38% w/w, or from about 27% to 35% w/w, and especially from about 27% to 32% w/w.

In one preferred embodiment the concentration stage in step (b) will take the spent sulphuric acid to a concentration in the range of 28% to 35% w/w, such as from 28% to 34% w/w.

In particular, the step (b) may take the spent sulphuric acid from a concentration of about 24% w/w or less and especially about 23% w/w or less (such as from about 17% to 22% w/w and usually about 21% to 22% w/w) to a concentration in the range of about 26% or more, preferably about 27% or more, such as from about 27% to 35% w/w, or from about 28% to 34% w/w, or from about 27% to 32% w/w, or from about 28% to 32% w/w.

In one embodiment, the spent sulphuric acid is concentrated in step (b) to a concentration in the range of about 26% to 32% w/w, preferably from about 27% to 32% w/w, more preferably from 28% to 32% w/w, such as about 28% to 31% w/w or about 29% to 32% w/w or about 30% to 32% w/w.

There is a benefit achieved by concentrating the sulphuric acid in step (b). Specifically, if spent sulphuric acid was used directly, without being concentrated, the concentration of magnesium sulphate in solution after the reaction of the magnesium-based neutralising agent and the sulphuric acid in step (c) would be relatively low, and therefore to achieve an acceptable yield of magnesium sulphate crystals the crystallization step (d) would need to involve cooling to a temperature of well below 20° C., e.g. to about 10° C. or less, which is economically unacceptable.

In contrast, by carrying out a concentration step, and preferably concentrating the spent sulphuric acid to a concentration in the range of about 26% or more (preferably 27% or more), the process can achieve good yields of magnesium sulphate crystals by cooling down to a temperature in the range of from 35° C. to 20° C. in the crystallization step (d).

It is, however, preferred to avoid concentrating the acid to a high concentration in step (b). Not only is this less economic, but in addition it can result in the yields of magnesium sulphate crystals in step (d) being so high that it can be difficult to transfer the product to equipment for carrying out separation of the crystals in step (e).

For example, if the acid is concentrated to a level of above 40% in step (b), the magnesium sulphate solution that is obtained in step (c) is very concentrated, and therefore during the crystallization step (d) the amount of crystals may exceed 90%. In that case, it may become difficult to transfer the product to equipment, such as a centrifuge unit, for separating out the crystals from the remaining liquor.

It is, therefore, preferred to concentrate the acid in step (b) so that it is in a range of from 26% to 40% w/w, e.g. from 26% to 39% w/w, or from 27% to 38% w/w, or from 27% to 37% w/w; in one embodiment it may be from 26% to 37% w/w, such as from 27% to 36% w/w. More preferably the acid is concentrated in step (b) so that it is in a range of from 28% to 35% w/w, such as from 28% to 33% w/w or from 29% to 32% w/w or from 30% to 32% w/w.

It may be that the concentration stage (b) involves concentrating portions of the spent sulphuric acid to different concentration levels, and then blending these portions having different concentration values together in suitable ratios in order to achieve a concentrated product having a concentration in the desired range. For example, one portion of the spent sulphuric acid may be concentrated to have a concentration level of sulphuric acid in the range of 25% to 30% w/w (e.g. from 25% to 28% w/w or from 25% to 27% w/w) and a second portion of the spent sulphuric acid may be concentrated to have a concentration level of sulphuric acid in the range of 31% to 50% w/w (e.g. from 32% to 45% w/w or from 33% to 43% w/w), and these two portions are then blended together in suitable ratios in order to achieve a concentrated product having a sulphuric acid concentration in the desired range (e.g. in the range of from 28% to 35% w/w, such as from 28% to 32% w/w, or from 29% to 32% w/w).

In one such embodiment, a blend of acids having different concentrations is used to obtain the acid that is used in step (c) and this may be a blend of acid with a concentration of from 26%-28% w/w together with acid with a concentration of from 39%-42% w/w in suitable ratios in order to achieve a concentrated product having a sulphuric acid concentration in the desired range (e.g. in the range of from 28% to 35% w/w, such as from 28% to 32% w/w, or from 29% to 32% w/w).

It may alternatively be that the concentration stage (b) involves concentrating the spent sulphuric acid to a higher concentration level than desired, and then subsequently diluting the product in order to achieve a concentrated product having a sulphuric acid concentration in the desired range (e.g. in the range of from 28% to 35% w/w, such as from 28% to 32% w/w, or from 29% to 32% w/w).

It may alternatively be that the concentration stage (b) involves directly concentrating the spent sulphuric acid to a sulphuric acid concentration in the desired range (e.g. in the range of from 28% to 35% w/w, such as from 28% to 32% w/w, or from 29% to 32% w/w).

The concentration step (b) may be carried out using any suitable technique. For example, it may be effected using evaporation at elevated temperature, such that the aqueous solvent is evaporated and therefore the total amount of aqueous solvent is reduced. The evaporation may optionally be effected under vacuum, i.e. at a pressure below room pressure.

In one embodiment, the concentration step (b) is effected using evaporation at a temperature above room temperature (e.g. 23° C. or higher, such as 25° C. or higher, or 30° C. or higher, or 40° C. or higher; for example it may be from 30° C. to 85° C. or from 35° C. to 75° C. or from 40° C. to 65° C.). In one embodiment, the concentration step (b) is effected using evaporation at a pressure below room pressure (e.g. 75 kPa or lower, such as 60 kPa or lower, or 50 kPa or lower, or 40 kPa or lower; for example it may be from 1 to 50 kPa, or from 1 to 30 kPa, or from 2 to 20 kPa, or from 3 to 10 kPa). In one embodiment, the concentration step (b) is effected using evaporation at a temperature above room temperature and at a pressure below room pressure.

In one embodiment, the concentration step (b) is effected using evaporation at a temperature of 30° C. or higher and at a pressure of 50 kPa or lower, e.g. from 30° C. to 75° C. and at a pressure of from 1 to 30 kPa.

In one embodiment, the concentration step (b) is effected using evaporation at a temperature of from 40° C. to 65° C. and at a pressure of from 3 to 10 kPa.

In an optional step, metal salts are added to the sulphuric acid product before step (c) is carried out. These salts may be added before concentration step (b), during concentration step (b), or after concentration step (b).

These salts may be one or more metal salts selected from Al salts, Ca salts, Cr salts, Fe salts, Mg salts, Mn salts, Na salts, Ti salts and V salts. Preferably, these salts are provided in the form of their sulphates. In one embodiment two or more such sulphate salts are included, such as three, four, five, six, seven, eight or more such salts. In one embodiment, sulphates of Al, Ca, Cr, Fe, Mg, Mn, Na, Ti and V are all included.

The salts may be added in a total amount of 1% w/w or more, e.g. 2% or more, 3% or more, 4% or more or 5% or more w/w. For example, they may be added in an amount of from 1 to 10% w/w, such as from 2 to 8% or 3 to 7% or from 4 to 6% w/w.

It can be beneficial to add such salts to improve the crystallization efficiency in step (d).

The salts may be second filtration salts obtained during the concentration of spent sulphuric acid from the sulphate process for the production of titanium dioxide. As noted above, these are generally sulphates of Al, Ca, Cr, Fe, Mg, Mn, Na, Ti and/or V.

Therefore a further benefit of the method is that the need to separately dispose of waste salts, obtained during the concentration of spent sulphuric acid from the sulphate process for the production of titanium dioxide, is avoided. Instead these salts can be directly utilised in the claimed method. Therefore there is reduced waste and crystallization efficiency in step (d) can also be improved.

The concentration of the acid before the reaction in step (c) can also result in a higher content of soluble magnesium in the end product.

Following the concentration step (b) a magnesium-based neutralising agent is combined with the acid in step (c), in order to generate magnesium sulphate in solution. This may suitably be a magnesium salt that can react with sulphuric acid to produce magnesium sulphate. In one embodiment it may be magnesium oxide (MgO) or magnesium hydroxide (Mg(OH)$_2$) or magnesium carbonate (MgCO$_3$). Combinations of two or three of these compounds may also be used. In one embodiment, some or all of the magnesium-based neutralising agent is provided in mineral form, for example in the form of magnesite.

The neutralising agent may be added in any suitable amount. If the magnesium-based neutralising agent is provided in mineral form, or in any other form that is not 100% magnesium salt, then account should of course be taken as to the actual content of magnesium in the material when determining an amount of the material to be added. The reader will also appreciate that the amount of magnesium-based neutralising agent that is suitably added to the acid will depend on the strength of the acid used. Generally, the higher the acid strength, the greater amount of magnesium that will need to be added in step (c) by the addition of magnesium-based neutralising agent. Equally, the higher the proportion of magnesium that is present in the magnesium-based neutralising agent, the less of that material that will need to be added (for the same acid strength).

It may be that the neutralising agent is added in an amount of 1% or more w/w (e.g. 2% or more w/w, or 3% or more w/w, or 4% or more w/w) to the concentrated sulphuric acid product. In one embodiment it is added in an amount from 2% to 45% w/w, preferably from 3% to 40% w/w, such as from 4% to 35% w/w.

In one embodiment, the neutralising agent is added in an amount of 5% or more w/w (e.g. 6% or more w/w or 7% or more w/w) to the concentrated sulphuric acid product. In one embodiment it is added in an amount from 5% to 35% w/w, preferably from 6% to 30% w/w (such as from 7% to 25% w/w or from 8% to 25% w/w or from 9% to 20% w/w or from 10% to 18% w/w).

The following table gives examples of amounts of magnesite that may be used in step (c) as the magnesium-based neutralising agent, depending on the concentration and amount of acid used.

| % H$_2$SO$_4$ | % mass acid | % mass magnesite |
|---|---|---|
| 26.0 | 85.21 | 14.79 |
| 28.0 | 84.26 | 15.74 |
| 28.4 | 85.35 | 14.60 |
| 30.0 | 83.32 | 16.68 |
| 31.0 | 84.25 | 15.70 |
| 31.0 | 82.83 | 17.17 |
| 32.0 | 82.40 | 17.60 |
| 32.5 | 84.50 | 15.50 |
| 33.0 | 83.40 | 16.58 |
| 35.0 | 81.06 | 18.94 |
| 40.0 | 78.56 | 21.44 |

These amounts are of course simply exemplary, to provide a useful guide, rather than limiting.

Generally, it is desirable to have a stoichiometric excess of magnesium-based neutralising agent (e.g. an excess of up to 10 wt %, such as from 0.5 to 10 wt % or from 1 to 9 wt % or from 2 to 8 wt %, when considering the amount of Mg in the magnesium-based neutralising agent and the amount of $SO_4$ in the concentrated spent sulphuric acid). This can achieve desirable characteristics for the end product, e.g. in terms of the pH of the dried $MgSO_4$ crystals, and free acid concentration.

Step (c) involves an exothermic reaction, and therefore occurs at elevated temperature. It may be a temperature above 50° C., such as 60° C. or higher, or 70° C. or higher. Preferably the elevated temperature is controlled to be less than 120° C., e.g. less than 110° C., or less than 105° C., or less than 100° C.; this may suitably be achieved by cooling of the reaction vessel. In one preferred embodiment, the temperature is controlled to be 110° C. or less, preferably from 80° C. to 110° C., e.g. from 85° C. to 100° C., such as from 90° C. to 95° C.

In one embodiment, the elevated temperature is controlled to be 85° C. or higher and preferably 90° C. or higher, such as from 90° C. to 110° C., e.g. from 90° C. to 105° C., such as from 90° C. to 100° C. It may be desired to avoid dropping the temperature to less than about 85° C. or 90° C., because below those temperature levels the extent of solubilisation/attack of the magnesium-based neutralising agent by the acid will decrease. There is also the possibility of crystallisation of $MgSO_4$ occurring, causing blockage.

It may the pH is controlled during step (c). In one embodiment, the pH is controlled to be in the range of from 0.2 to 7, preferably from 0.3 to 5, more preferably as from 0.4 to 4. In one embodiment, the pH is controlled to be in the range of from 0.4 to 3.5, such as from 0.5 to 3 or from 0.5 to 2.5. It may be that the pH is controlled to be from about 0.5 to 2.

Generally, if the pH is too high there is not enough acid to react with the magnesium-based neutralising agent. It is therefore desirable to maintain the pH below 5, such as below 4 or below 3. Another advantage of controlling the pH to be low is that there is less precipitation of impurities, such as Cr impurities, and the quality of the end product is improved.

The step (c) may be carried out for any suitable length of time to allow reaction of the magnesium salt with the sulphuric acid to produce magnesium sulphate. In one embodiment, the step is carried out for from 5 minutes to 5 hours, such as from 10 minutes to 3 hours or from 20 minutes to 2 hours.

The reaction time may be chosen taking into account factors such as the average particle size and size distribution of the magnesium-based neutralising agent, the composition of the magnesium-based neutralising agent, the acid strength, the temperature, and the effectiveness of any mixing techniques used in step (c).

Although the reaction between the magnesium-based neutralising agent and the acid may be quick, and even instantaneous, there can be benefits in maintaining contact between these two reagents, e.g. to improve the efficiency of the acid attack.

If step (c) is carried out at relatively high temperature, e.g. at around 100° C. to 120° C., the contact time between the reactants can suitably be relatively short, e.g. from about 10 minutes upwards, and may be from 10 minutes to 2 hours or more, e.g. from 15 minutes to 2 hours or from 20 minutes to 1 hour. If there is cooling carried out to control the temperature to be lower, e.g. at around 80° C. to 95° C., the contact time between the reactants will desirably be a little longer, such as from about 20 minutes upwards, and may be from 20 minutes to 2 hours or more, e.g. from 25 minutes to 2 hours or from 30 minutes to 1.5 hours.

Step (c) is preferably carried out in the liquid phase. In one embodiment the magnesium-based neutralising agent may be dissolved or suspended in a liquid, such as an aqueous solvent or carrier, e.g. water, before it is combined with the acid.

If the reaction takes place in a liquid phase it can result in a better yield and a higher content of soluble magnesium in the crystals obtained by the method.

Agitation is suitably carried out during some or all of step (c). This may assist the reaction and may minimise scale build up on the walls of the reaction vessel.

Step (c) may be carried out in any suitable vessel. The vessel may, for example, be a jacketed reactor vessel.

The vessel may optionally be provided with a cooling system, e.g. a water cooling system, to allow control of the temperature within the vessel. In another embodiment the vessel does not have a cooling system; if there is no cooling then evaporation of water will occur during this step.

The use of a double-walled jacket could be considered, which would allow cooling of the reactor vessel by running a cooling fluid, such as water, through the double wall.

The reaction product may be pumped out from towards the bottom of the reactor vessel and then transferred back into the reactor towards the top of the reactor vessel. In that case an outside cooling system may be applied, to cool the reaction product when it is outside the reactor vessel, in order to decrease the temperature in the reactor vessel.

In one embodiment one or more agitators are used in the vessel to minimise scale build up on the vessel walls. Known agitators may be used in this regard. The agitators may be designed to help incorporate the magnesium-based neutralising agent with the acid and to prevent flotation of magnesium-based neutralising agent above the acid.

The reaction of step (c) may be carried out as a batch process or as a continuous process. As the reader will appreciate, if the reaction is carried out as a continuous reaction the reactor is filled continuously with the magnesium-based neutralising agent and the acid (optionally together with water and/or recycled liquor as required).

In step (d) a crystallization stage is carried out. The magnesium sulphate therefore crystallizes out from the solution. Any ferrous sulphate present will also crystallize out.

The crystallization may suitably be effected by a cooling technique. The cooling may suitably cool the solution down to a temperature of 40° C. or lower, preferably 35° C. or lower, such as down to a temperature in the range of from 35° C. to 20° C., preferably from 35° C. to 23° C. and more preferably from 35° C. to 25° C.

Ideally the temperature at the crystallization stage is adjusted to ensure that in the vessel where crystallization is being effected there is an amount of crystals of 85% w/w or less, e.g. from 20 to 80% w/w or from 30 to 75% w/w or from 35 to 70% w/w. This is beneficial in terms of preventing blockages when the product is transferred to another location, e.g. when it is fed to a centrifuge or other device for separating the crystals from the remaining liquor. The skilled reader will appreciate that the lower the temperature, the more crystals that will come out of solution and hence it is preferred that the solution is not cooled below 20° C., preferably not below 23° C. and more preferably not below 25° C.

Step (d) may be carried out in any suitable crystallization vessel. In one embodiment the cooling is carried out in a vessel which is a jacketed crystallizer. The cooling may be effected by a water cooling system.

In one embodiment the crystallization is effected by use of one or more crystallization vessel, such as two or more or three or more crystallization vessels. Where more than one vessel is used these may be used to progressively cool the solution down; for example the first vessel may cool the solution down to a temperature of 50° C. or lower (e.g. about 45° C.) and then the second may cool the solution down to 40° C. or lower (e.g. about 35° C.). Optionally a third vessel may cool the solution down to a temperature of 30° C. or lower (e.g. about 20° C. or about 25° C.). Of course it will be appreciated that any suitable number of crystallization vessels could be used if desired.

Agitation is suitably carried out during some or all of step (d). This may assist the crystallization and may minimise scale build up on the walls of the crystallization vessel.

In one embodiment one or more agitators are used in the (or each) crystallization vessel to minimise scale build up on the vessel walls. Known agitators may be used in this regard.

At this stage the crystalline product is in the form of magnesium sulphate heptahydrate. This will generally contain from 12% to 16% w/w (especially from 13% to 15% w/w, e.g. about 14% w/w) soluble magnesium sulphate when expressed as MgO.

The crystals may then be separated from the remaining liquor. Therefore a crystalline magnesium sulphate heptahydrate product is obtained. This product may comprise ferrous sulphate as well as magnesium sulphate heptahydrate.

The optional separation step (e) may suitably be carried out using a centrifuge or other known separation technique such as filtration.

A centrifuge can be more cost effective than other separation techniques. The use of a centrifuge in step (e) can be technically beneficial in that it helps to minimise adsorbed water on the surface of the $MgSO_4.7H_2O$ crystals. This therefore means that subsequent drying of the crystals will require less energy consumption.

Some or all of the remaining liquor that is left after separation of the crystals may be recycled back into the process, to step (b) and/or step (c) and/or step (d). It is a benefit of the present invention that the liquor may be recycled in this manner, meaning that there can be minimal effluent. For example, 50% w/w of the remaining liquor may be recycled back to step (b) and/or step (c) and/or step (d), such as 60% or more, 70% or more, 80% or more, 90% or more or 95% or more.

Preferably the liquor that is recycled is recycled back to step (c) or step (d).

Generally it is less preferred to recycle to step (b) than to step (c) or (d). In the liquor there may be residues, such as $CaSO_4$ and $SiO_2$, which may disturb any evaporation process used to concentrate the acid. Further, the liquor may include chloride ions and therefore if this is recycled to step (b) the amount of chloride ions in that step may increase to a level that is overly corrosive, e.g. >3000 ppm. This may damage equipment used in step (b), such as evaporation equipment.

A benefit of recycling to step (c) is that the addition of the cool liquor to step (c) may reduce the amount of cooling needed to control the temperature in this step to a desired level.

A benefit of recycling to step (d) rather than step (c), however, is that the natural evaporation of solvent is then higher in step (c), and therefore the amount of cooling required to achieve the desired crystallisation in step (d) is reduced. Further, the addition of the cool liquor to step (d) can assist with the cooling required for crystallisation.

Any of the remaining liquor that is left after separation of the crystals and that is not recycled back to step (b) or step (c) or step (d) may be treated in an effluent treatment plant.

The key deciding factors on how much of the liquor that is left after separation of the crystals in step (e) is to be recycled are: (i) the chloride content of the liquor and (ii) the water balance in the overall process. The level of chloride ions in the process needs to be controlled to ensure that corrosion related problems are avoided. Therefore if the liquor has a high content of chloride it may be that less is recycled. Meanwhile, if in the overall process the amount of water is high and the amount of crystals being generated is low, then there will be a greater amount of liquor generated. If too much of this is recycled, this will exacerbate the problem of too much water and not enough crystals. Therefore it is important that if the balance of water in the process starts getting too high, less liquor is recycled within the process. The reader will appreciate that the factors (i) and (ii) can be monitored and the amount of liquor being recycled can be adjusted accordingly.

In the effluent treatment plant that receives any liquor from the process the liquor may be mixed with spent sulphuric acid from the sulphate process for manufacturing titanium dioxide. Any magnesium which is contained in the liquor sent to the effluent treatment plant may be recovered.

In the effluent treatment plant that receives any liquor from the process, a treatment may be carried out to remove any chromium present.

In one embodiment a treatment in the effluent treatment plant comprises increasing the pH of the liquor up to 5 or higher, such as from 5 to 7, e.g. to about 5.2. This treatment has been found to be sufficient to completely purify the liquor. In particular, it leads to the precipitation of Ti, Al, Fe, Cr, V, and the like out of the liquor.

An example of the composition of the liquor as obtained from step (e), pre- and post-treatment (by increasing the pH to 5.2 with caustic sodium) is given in the table below. The composition of the precipitated material is also given.

|  | Liquor (pre-treatment) | Liquor (post-treatment) | Precipitate from treated liquor |
| --- | --- | --- | --- |
| pH | 1.70 | 5.2 | 5.2 |
| % MgO Total | 6.67 | 2.01 | 8.0 |
| % CaO | 0.28 | 0.14 | 0.44 |
| ppm Cr | 587 | 2 | 6768 |
| ppm Ni | 11 | 3 | 38 |
| % Al | 0.55 | 0.00 | 6.80 |
| % Fe | 1.51 | 0.25 | 8.83 |
| % Mn | 0.11 | 0.03 | 0.15 |
| % Na | 0.48 | 0.70 | 2.82 |
| % Ti | 0.27 | 0.00 | 2.52 |
| % V | 0.13 | 0.00 | 1.47 |

In one embodiment, the crystalline product that has been separated out in step (e) is optionally dried.

The reader will appreciate that an acceptable degree of hydration for the dried product will depend on factors such as the intended end use for the dried product, acceptable levels of cost and energy used in the process, and product density.

The dried product may be any hydrate that has a degree of hydration less than seven. It may be that the dried product has a degree of hydration of two or less. Preferably the dried product is a stoichiometric hydrate of magnesium sulphate.

The drying step may in one embodiment comprise drying the product to obtain the monohydrate form of the magnesium sulphate. The drying step may in another embodiment comprise drying the product to obtain the dihydrate form of the magnesium sulphate.

The dried product may comprise ferrous sulphate as well. Thus, in one embodiment, it may comprise magnesium sulphate monohydrate and/or magnesium sulphate dihydrate, together with ferrous sulphate.

The drying of optional step (f) may be effected at any suitable temperature in order to convert the magnesium sulphate heptahydrate into a less hydrated form, e.g. into dihydrate or monohydrate form. For example, the crystalline magnesium sulphate heptahydrate product may be dried at a temperature of 150° C. or more, such as 170° C. or more, or 180° C. or more, e.g. from 150 to 250° C. or more, such as from 170 to 230° C., or from 180 to 220° C., or from 190 to 210° C. In one embodiment, the drying is effected at a temperature of about 200° C.

The drying may be carried out for any suitable length of time, e.g. 5 minutes or more, such as 10 minutes or more, or 20 minutes or more, or 30 minutes or more. In one embodiment it is from 10 minutes to 12 hours, such as from 30 minutes to 6 hours.

The final crystalline product obtained after drying comprises magnesium sulphate crystals with a degree of hydration that is less than seven. In one embodiment it comprises magnesium sulphate crystals in the form of magnesium sulphate monohydrate, and in another embodiment it comprises magnesium sulphate crystals in the form of magnesium sulphate dihydrate. This final crystalline product will generally contain about 21% to 28% w/w soluble magnesium sulphate when expressed as MgO. In many embodiments the range will be about 22% to 25% w/w, but in some embodiments the final crystalline product may contain more than 25% w/w soluble magnesium sulphate when expressed as MgO, e.g. it may be from 25% to 27% w/w. Therefore the end product is beneficial and particularly suitable for use as a fertilizer due to its high magnesium sulphate content.

Therefore an advantage of the claimed method is that a high level of soluble magnesium is present in the resultant crystals.

The crystalline product obtained after drying may also comprise ferrous sulphate crystals. This is beneficial if the product is to be used as a fertiliser, as it is a further valuable micronutrient for fertiliser applications.

Generally, the crystalline product as made by the method of the invention will include magnesium sulphate crystals together with one or more other elements. These may, for example, be one or more of Ca, Al, Ti, Fe and Cr. These may be present in salt form, e.g. in sulphate form.

The magnesium sulphate can be used directly as a fertiliser or blended with other fertilisers to produce a complex fertiliser.

The magnesium sulphate can be used in its crystalline form or can be granulated. In one embodiment of the method of the first aspect, therefore, an optional step (h) of granulating the magnesium sulphate is carried out. This may suitably be carried out after steps (e) and (f). Step (g) may or may not be carried out. If step (g) is carried out, this may be before, at the same time as, or after, step (h).

The present invention further provides a crystalline product that comprises magnesium sulphate crystals in the form of magnesium sulphate heptahydrate, as obtainable by carrying out steps (a) to (e) of the method of the first aspect (optional step (f) is not carried out). Optional step (g) may or may not be carried out.

The present invention also provides a crystalline product that comprises magnesium sulphate crystals in the form of magnesium sulphate dihydrate, as obtainable by carrying out steps (a) to (f) of the method of the first aspect. Optional step (g) may or may not be carried out.

The present invention also provides a crystalline product that comprises magnesium sulphate crystals in the form of magnesium sulphate monohydrate, as obtainable by carrying out steps (a) to (f) of the method of the first aspect. Optional step (g) may or may not be carried out.

The present invention further provides a granulated product that comprises magnesium sulphate granules in the form of magnesium sulphate dihydrate, as obtainable by carrying out steps (a) to (e) or steps (a) to (f), and then step (h), of the method of the first aspect. Optional step (g) may or may not be carried out.

The present invention further provides a granulated product that comprises magnesium sulphate granules in the form of magnesium sulphate monohydrate, as obtainable by carrying out steps (a) to (e) or steps (a) to (f), and then step (h), of the method of the first aspect. Optional step (g) may or may not be carried out.

The present invention further provides, in a second aspect, a method of producing a fertiliser, wherein the method comprises:
  producing magnesium sulphate by carrying out the method of the first aspect;
  mixing the magnesium sulphate with an agriculturally acceptable carrier or diluent and/or with other fertiliser materials.

The magnesium sulphate may be produced in the form of magnesium sulphate heptahydrate crystals or in the form of magnesium sulphate dihydrate crystals or in the form of magnesium sulphate dihydrate granules or in the form of magnesium sulphate monohydrate crystals or in the form of magnesium sulphate monohydrate granules.

The invention also provides a fertiliser comprising magnesium sulphate, as obtainable by carrying out the method of the second aspect.

The invention will now be further described, in a non-limiting fashion, in the following examples.

EXAMPLES

Example 1

Batch Production without Reactor Cooling

Waste acid that has been obtained as a by-product during the sulphate process for manufacturing titanium dioxide acid is provided and is concentrated to achieve a level of 32.5% $H_2SO_4$ w/w.

700 litres of warmed water (at least 50° C.) is introduced in a reactor; then 1000 kg of powdered magnesite is added progressively and mixed thoroughly with the water by continuous stirring.

After the magnesite slurry has been homogenized, 5451 kg of the concentrated acid is added to the reactor over a period of 5 to 10 minutes. Very quickly (within 2-3 min) the temperature in the reactor reaches 105° C. Antifoaming agent is added as required.

Within about 10 minutes after the addition of all the acid, the two reagents are well mixed. After 4 hours of maturation/crystallization, the pH of the reaction product is 1.1.

The reaction product is cooled down to 35° C. or lower, e.g. about 25° C. In this regard, the reaction product is transferred to a series of cooling vessels where the temperature is reduced gradually; firstly to 65°-75° C., then to 45° C.-55° C. and finally to 25° C.-35° C. The amount of magnesium sulphate heptahydrate crystals increases as the temperature is reduced.

Separation of the crystals from the remaining liquor may be effected by simple filtration on a 250 μm sieve or by centrifugation.

The mass of wet crystals is around 77% of the total initial mass of reagents added in the reactor. The filtrates contain 1.64% acid and their specific gravity is 1.39. By calculation it is found that 94.1% of the MgO from the magnesite starting material has been attacked and solubilised.

|  | Reaction liquor | Filtrate | Dried Crystals 200° C. | Composition of the magnesite used | |
|---|---|---|---|---|---|
| % MgO Total | 10.67 | 6.89 | 22.72 | % MgO tot. | 69.5 |
| % MgO Soluble | 10.48 | 6.81 | 22.26 |  |  |
| % SO$_4$ | 31.15 | 24.07 | 65.28 | % SO$_4$ | 5.4 |
| % CaO | 1.20 | 0.59 | 2.61 | % CaO | 9 |
| ppm Cr | 229 | 438 | 245 | ppm Cr | 9 |
| ppm Ni | 19 | 11 | 41 | ppm Ni | 110 |
| % Al | 0.20 | 0.39 | 0.21 | % Al | 0.12 |
| % Fe | 1.58 | 1.45 | 3.24 | % Fe | 1.68 |
| % Mn | 0.07 | 0.11 | 0.12 | % Mn | 0.10 |
| % Na | 0.36 | 0.54 | 0.56 | % Na | 0.29 |
| % Ti | 0.16 | 0.27 | 0.21 | % Ti | <0.01 |
| % V | 0.06 | 0.12 | 0.07 | % V | 0.05 |
| % H$_2$SO$_4$ |  | 1.64 |  | % SiO$_2$ | 3.18 |
| pH | 1.1 |  | 3.4 | % C | 2.91 |

Example 1b

Batch Production without Reactor Cooling, with Recycling of the Liquor

This Example is based on the method of Example 1 but the liquor that is separated from the crystals is recycled. In this case almost 70% of the liquor is recycled, as follows.

Waste acid that has been obtained as a by-product during the sulphate process for manufacturing titanium dioxide acid is provided and is concentrated to achieve a level of 32.5% H$_2$SO$_4$ w/w.

Water (330 kg) and the recycled liquor (1200 kg; specific gravity 1.37 and acid strength 1.31%) are both added to a reactor, followed by powdered magnesite (1000 kg). After homogenisation by mixing with a stirrer, concentrated acid (5320 kg) is added to the reactor.

Within about 10-20 minutes after the addition of all the acid the reaction product is transferred to cooling vessels to cool the reaction product from about 105° C. down to 35° C. or lower, e.g. about 25° C. This may suitably be via use of a series of cooling vessels where the temperature is reduced gradually; firstly to 65°-75° C., then to 45° C.-55° C. and finally to 25° C.-35° C.

By calculation it is found that 95.1% of the MgO from the magnesite starting material has been attacked and solubilised. The mass of wet crystals is approximately 74% of the total initial mass of reagents added in the reactor.

|  | Reaction liquor | Filtrate | Dried Crystals 200° C. |
|---|---|---|---|
| % MgO Total | 10.46 | 7.01 | 21.93 |
| % MgO Soluble | 10.44 | 6.82 | 21.51 |
| % SO$_4$ | 31.8 | 24.9 | 62.4 |
| % CaO | 1.23 | 0.79 | 2.43 |
| ppm Cr | 284 | 508 | 327 |
| ppm Ni | 19 | 11 | 37 |
| % Al | 0.26 | 0.45 | 0.29 |
| % Fe | 1.63 | 1.47 | 3.27 |
| % Mn | 0.08 | 0.12 | 0.14 |
| % Na | 0.47 | 0.61 | 0.66 |
| % Ti | 0.19 | 0.30 | 0.25 |
| % V | 0.08 | 0.14 | 0.09 |
| % H2SO4 |  | 1.47 |  |
| pH | 1.27 |  | 3.5 |

Example 2

Batch Production without Reactor Cooling, with Addition of Salts

Waste acid that has been obtained as a by-product during the sulphate process for manufacturing titanium dioxide acid is provided and is concentrated to achieve a level of 32.5% H$_2$SO$_4$ w/w.

700 litres of warmed water (at least 50° C.) and 250 kg of second filtration salts are introduced in a reactor; then 1000 kg of powdered magnesite is added progressively and mixed thoroughly with the water by continuous stirring. The second filtration salts are generated as a waste product during the concentration of spent sulphuric acid obtained from the sulphate process for the production of titanium dioxide.

After the magnesite slurry has been homogenized, 5136 kg of the concentrated acid is added to the reactor over a period of 5 to 10 minutes. Antifoaming agent is added as required.

Within about 10-20 minutes after the addition of all the acid, the reagents are well mixed. After 4 hours of maturation/crystallization, the pH of the reaction product is 0.9.

The reaction product is cooled down to 35° C. or lower, e.g. about 25° C. In this regard, the reaction product is transferred to a series of cooling vessels where the temperature is reduced gradually; firstly to 65°-75° C., then to 45° C.-55° C. and finally to 25° C.-35° C. The amount of magnesium sulphate heptahydrate crystals increases as the temperature is reduced.

Separation of the crystals from the remaining liquor may be effected by simple filtration on a 250 μm sieve or by centrifugation.

By calculation it is found that 95.5% of the MgO from the magnesite starting material has been attacked and solubilised. The mass of wet crystals is approximately 82% of the total initial mass of reagents added in the reactor.

|  | Reaction liquor | Filtrate | Dried Crystals 200° C. |
|---|---|---|---|
| % MgO Total | 10.85 | 6.82 | 22.49 |
| % MgO Soluble | 10.79 | 6.82 | 22.43 |
| % SO$_4$ | 33.10 | 26.30 | 64.10 |
| % CaO | 1.26 | 0.59 | 2.25 |
| ppm Cr | 311 | 627 | 344 |
| ppm Ni | 20 | 10 | 41 |
| % Al | 0.30 | 0.61 | 0.33 |
| % Fe | 1.61 | 1.60 | 3.16 |
| % Mn | 0.08 | 0.12 | 0.14 |
| % Na | 0.42 | 0.67 | 0.59 |
| % Ti | 0.17 | 0.30 | 0.23 |
| % V | 0.07 | 0.14 | 0.08 |
| % H2SO4 |  | 1.92 |  |
| pH | 0.92 |  | 3.3 |

Example 2b

Batch Production without Reactor Cooling, with Addition of Salts and with Recycling of the Liquor This Example is based on the method of Example 2 but the liquor that is separated from the crystals is recycled, in the same manner as described in Example 1b.

The amount of reagents used were:
Water: 508 kg
Recycled liquor: 1000 kg (specific gravity 1.47, 1.81% H$_2$SO$_4$)
Magnesite: 1000 kg
Acid (32.5% w/w): 4990 kg
Second filtration salts: 244 kg Analytical results of the products obtained are given in the table below

|  | Reaction liquor | Filtrate | Dried Crystals 200° C. |
|---|---|---|---|
| % MgO Total | 10.87 | 6.90 | 21.87 |
| % MgO Soluble | 10.65 | 6.73 | 21.81 |
| % $SO_4$ | 33.2 | 27.1 | 65.0 |
| % CaO | 1.23 | 0.88 | 2.12 |
| ppm Cr | 346 | 721 | 523 |
| ppm Ni | 19 | 12 | 38 |
| % Al | 0.36 | 0.69 | 0.55 |
| % Fe | 1.67 | 1.76 | 3.19 |
| % Mn | 0.09 | 0.13 | 0.16 |
| % Na | 0.48 | 0.74 | 0.81 |
| % Ti | 0.19 | 0.33 | 0.29 |
| % V | 0.08 | 0.16 | 0.12 |
| % $H2SO4$ |  | 1.72 |  |
| pH | 1.2 |  | 3.6 |

Example 3

The compositions of magnesium sulphate crystals obtained by the method of the invention (dried at 200° C.) as prepared in the lab, using various magnesites as starting materials, are set out below:

|  | A | B | C | D | E | F |
|---|---|---|---|---|---|---|
| % MgO Total | 22.1 | 22.2 | 22.4 | 24.6 | 26.2 | 23.3 |
| % MgO Soluble | 20.9 | 22.0 | 22.0 | 23.5 | 19.4 | 22.8 |
| % $SO_4$ | 61.52 | 65.10 | 64.13 | 60.66 | 25.94 | 64.28 |
| % CaO | 2.39 | 2.34 | 2.47 | 0.64 | 0.83 | 0.61 |
| ppm Cr | 352 | 437 | 310 | 364 | 281 | 376 |
| ppm Ni | 82 | 40 | 39 | <10 | 8 | 42 |
| % Al | 0.33 | 0.45 | 0.27 | 0.36 | 0.27 | 0.48 |
| % Fe | 2.66 | 3.13 | 3.30 | 3.47 | 3.59 | 3.13 |
| % Mn | 0.12 | 0.15 | 0.14 | 0.17 | 0.17 | 0.13 |
| % Na | 0.48 | 0.72 | 0.61 | 0.45 | 0.42 | 0.54 |
| % Ti | 0.23 | 0.26 | 0.24 | 0.21 | 0.17 | 0.24 |
| % V | 0.10 | 0.10 | 0.08 | 0.08 | 0.06 | 0.09 |
| % Free acid |  |  |  | <0.05 |  | 0.7 |
| pH | 3.3 | 3.5 | 3.5 | 3.3 | 2.9 | 3.5 |
| % Si |  |  |  |  |  | 1.10 |

It can be seen that all of the products had high levels of soluble magnesium sulphate when expressed as MgO, with these levels being in the range of 22% to 27% w/w. The crystalline product also includes ferrous sulphate and other elements. Therefore the product is beneficial and particularly suitable for use as a fertilizer.

The invention claimed is:

1. A method for the manufacture of a magnesium sulphate product, the method comprising the steps of:
   (a) providing a sulphuric acid product that has been obtained as a by-product during the sulphate process for manufacturing titanium dioxide;
   (b) concentrating the sulphuric acid product to obtain a concentrated product that has a higher sulphuric acid concentration;
   (c) combining a magnesium-based neutralising agent with the concentrated product and allowing the magnesium-based neutralising agent and the sulphuric acid to react, to generate magnesium sulphate in solution; and
   (d) crystallising magnesium sulphate out of the solution as obtained in step (c), to obtain a crystalline magnesium sulphate product together with a remaining liquor.

2. The method of claim 1, wherein the method further comprises the step of:
   (e) separating the crystallised magnesium sulphate product from the remaining liquor.

3. The method of claim 2, wherein the method further comprises the step of:
   (f) drying the crystallised magnesium sulphate product.

4. The method of claim 2, wherein after step (e), the method further comprises the step of:
   (g) recycling the remaining liquor to step (b) and/or step (c) and/or step (d).

5. The method of claim 2 wherein after step (e), the method further comprises the step of:
   (h) granulating the magnesium sulphate.

6. The method of claim 1 wherein the spent sulphuric acid product provided in step (a) has a concentration in the range from about 17% to 24% w/w.

7. The method of claim 1 wherein the spent sulphuric acid product provided in step (a) includes ferrous sulphate.

8. The method of claim 7 wherein the spent sulphuric acid product provided in step (a) includes ferrous sulphate an amount of from 0.1 to 8% w/w.

9. The method of claim 1 wherein step (b) takes the spent sulphuric acid to a concentration in the range of 26% to 40% w/w.

10. The method of claim 9 wherein step (b) takes the spent sulphuric acid to a concentration in the range of 28% to 35% w/w.

11. The method of claim 1 wherein metal salts are added to the sulphuric acid product before step (c) is carried out, in a total amount of from 1 to 10% w/w.

12. The method of claim 1 wherein the magnesium-based neutralising agent added in step (c) is selected from magnesium oxide, magnesium hydroxide, magnesium carbonate, and combinations thereof.

13. The method of claim 1 wherein the neutralising agent is added in step (c) in an amount of 2% or more w/w.

14. The method of claim 13 wherein the neutralising agent is added in step (c) in an amount of from 5% to 30% w/w.

15. The method of claim 1 wherein in step (c) the temperature is controlled to be from 80° C. to 110° C.

16. The method of claim 1 wherein in step (c) the pH is controlled to be in the range of from 0.2 to 7.

17. The method of claim 16 wherein in step (c) the pH is controlled to be in the range of from 0.3 to 5.

18. The method of claim 17 wherein in step (c) the pH is controlled to be in the range of from 0.4 to 4.

19. The method of claim 1 wherein in step (d) the crystallization is effected by cooling to a temperature of 40° C. or lower.

20. The method of claim 19 wherein in step (d) the crystallization is effected by cooling to a temperature in the range of from 35° C. to 20° C.

21. A method of producing a fertiliser, wherein the method comprises:
   carrying out the method of claim 1 in order to produce magnesium sulphate in the form of crystals or granules;
   mixing the magnesium sulphate with an agriculturally acceptable carrier or diluent and/or with other fertiliser materials.

* * * * *